Nov. 13, 1928.
F. X. MUDD
1,691,665
POULTRY COOP DOOR AND TROUGH
Filed Dec. 1, 1927
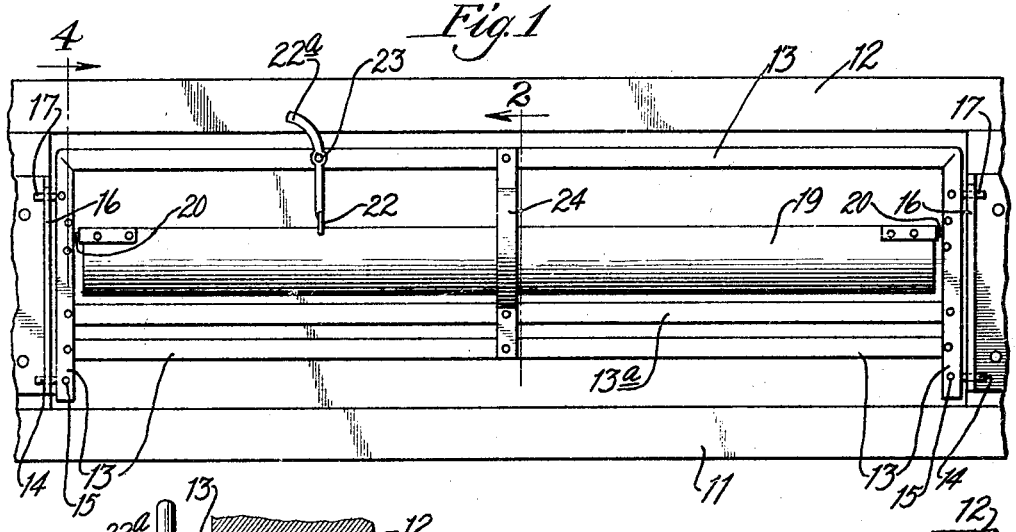
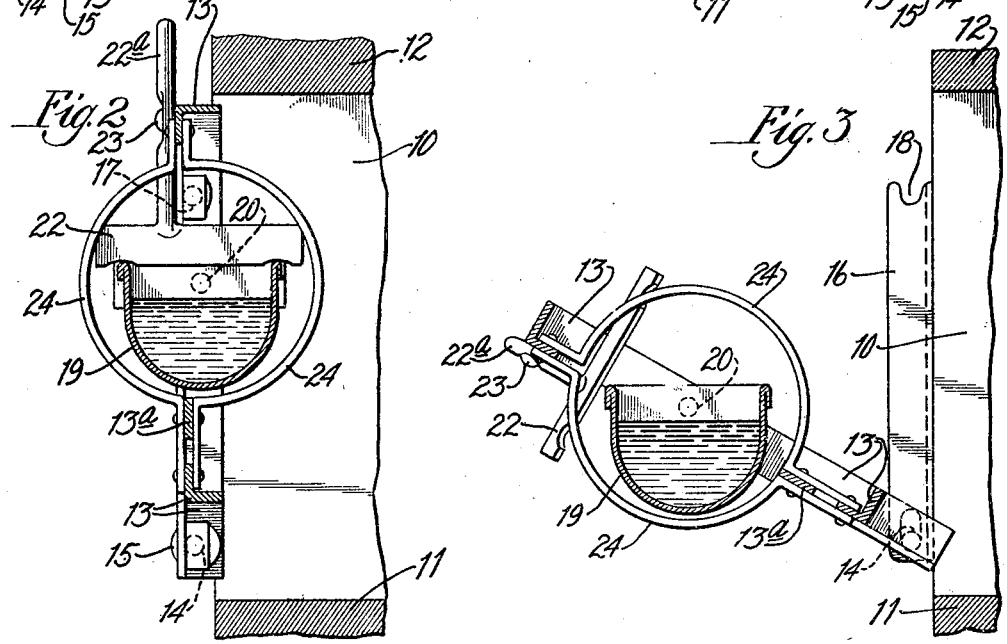
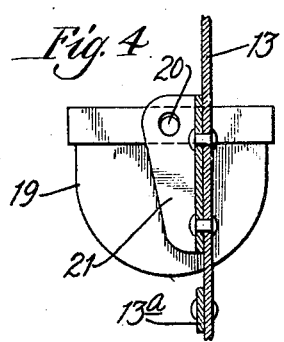
Inventor.
Francis X. Mudd
By Dyrenforth, Lee, Chritton & Wiles,
Attys.

Patented Nov. 13, 1928.

1,691,665

UNITED STATES PATENT OFFICE.

FRANCIS X. MUDD, OF CHICAGO, ILLINOIS.

POULTRY-COOP DOOR AND TROUGH.

Application filed December 1, 1927. Serial No. 236,958.

This invention relates to improvements in poultry coop door and trough, and more especially to such a device for use in poultry cars.

A form of poultry car now in common use is provided with a central aisle having tiers of coops on each side. These coops are ordinarily rectangularly shaped and provided with doors opening into the aisle, such doors being commonly hinged at their lower edges so that the upper edge may be swung outwardly and downwardly. In cars of this kind, it is common practice to provide feed and watering troughs between adjacent coops.

One of the features of my invention is the provision of an additional trough mounted on the door of the coop, thus giving substantially fifty percent extra trough capacity. In order to prevent the trough from spilling when the door is opened, I mount the same pivotally above the center of gravity so that as the door is swung downwardly, the trough rotates on its pivots, remaining at all times in an upright position.

In that form of device embodying the features of my invention shown in the accompanying drawings, Figure 1 is a view in front elevation of a coop of the character described, Fig. 2 is a view taken as indicated by the line 2 of Fig. 1, Fig. 3 is a view similar to Fig. 2 showing the door of the coop partly open, and Fig. 4 is a fragmentary view taken as indicated by the line 4 of Fig. 1.

As shown in the drawings, 10 indicates a coop, for example the coop in a poultry car, 11 indicating the floor and 12 the roof of the coop.

The front of the coop is closed in the ordinary manner by means of a rectangular shaped door comprising the frame 13 pivotally mounted at its lower corners by means of the trunnions 14 supported in the sockets 15 on the side members 16. The trunnions are preferably loosely mounted in the sockets 15 to permit the door to be raised or lowered a slight distance so that the pins 17 at the upper corners may be caught in the sockets 18 at the upper ends of the side members 16 to hold the door in closed position. 13$^a$ indicates an additional bar near the lower edge of the door to make a more perfect closure when the door is shut.

19 indicates a feed or watering trough of the usual form extending substantially the entire length of the door and provided at its ends near the top with pivots or trunnions 20 mounted in the brackets 21, attached to the side frame members 13 of the door. The trunnions 20 are located above the center of gravity of the trough 19 so that the trough will remain upright no matter what position the door is in.

22 indicates a catch pivotally supported at 23 to the upper frame member 13 of the door and provided with a handle 22$^a$. When in the position shown in Fig. 2, this catch 22 bears against the upper edges of the trough to hold the same in an upright position. In ordinary practice, the catch will assume the position shown in Figs. 1 and 2 by gravity to hold the trough upright and prevent the same from swinging due to movements of the car. In opening the door, the catch 22 is ordinarily moved upwardly to the position shown in Fig. 3 so that as the door is opened the trough is free to swing on its pivots and remain in an upright position.

24 indicates a ring-guard surrounding the trough and supported from the upper and lower frame members 13 of the door to protect the trough against damage.

It is to be noted that the trough 19 also serves as a part of the door to prevent escape of poultry through the frame 13.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In combination with a hinged door for a poultry car, a trough pivotally supported on said door, the pivot points being located above the center of gravity of said trough.

2. In combination with a door for a poultry coop pivotally mounted at its lower edge, a trough carried by said door and pivotally supported thereon, the pivot points of said trough being located above the center of gravity thereof.

3. In combination with a door for a poultry coop pivotally mounted on a horizontal axis, a trough carried by said door and pivotally mounted thereon, the pivot points of said trough being located above the center of gravity.

In witness whereof, I have hereunto set my hand this 29th day of November, 1927.

FRANCIS X. MUDD.